United States Patent [19]

Sekiguchi et al.

[11] Patent Number: 4,997,888
[45] Date of Patent: Mar. 5, 1991

[54] WEATHERABILITY AND ADHERENCE OF POLYPROPYLENE

[75] Inventors: Tetsuo Sekiguchi, Hasuda; Yutaka Nakahara, Okegawa; Masaki Yagi, Omiya; Naotoshi Sonoda, Urawa, all of Japan

[73] Assignee: Adeka Argus Chemical Co., Ltd., Urawa, Japan

[21] Appl. No.: 376,088

[22] Filed: Jul. 6, 1989

Related U.S. Application Data

[62] Division of Ser. No. 78,364, Jul. 27, 1987, abandoned.

[30] Foreign Application Priority Data

Jul. 28, 1986 [JP] Japan .................................. 61-177323

[51] Int. Cl.[5] ................................................ C08F 8/00
[52] U.S. Cl. .................................. 525/333.8; 525/375; 525/388
[58] Field of Search ............................. 525/375, 333.8

[56] References Cited

U.S. PATENT DOCUMENTS 4,404,301 9/1983 Kuboto et al. ...................... 525/375
4,429,077 1/1984 Kurrer et al. ....................... 525/375
4,499,220 2/1985 Minagawa et al. ................. 525/375

FOREIGN PATENT DOCUMENTS 58-179240 10/1983 Japan .

Primary Examiner—Bernard Lipman

[57] ABSTRACT

A process is provided for improving the resistance to deterioration when exposed to weather and the adherence to other materials of polypropylene, particularly in the form of moldings, which comprises subjecting a surface of polypropylene to the action of activated oxygen gas at a temperature below about 100° C. in the presence of an N-alkyl or N-acyl 2,2,6,6-tetramethyl piperidyl compound for a time sufficient to improve such weather resistance and adherence.

13 Claims, No Drawings

WEATHERABILITY AND ADHERENCE OF POLYPROPYLENE

This is a division of application Ser. No. 78,364, filed July 27, 1987 now abandoned.

Polypropylene resins have excellent mechanical properties, thermal properties and processability, in addition to being light in weight and relatively inexpensive, so that they find applications in a variety of molding shapes and sizes.

However, since polypropylene resins have inferior adherence to other materials, such as are used in coating compositions, their use in applications requiring that they be coated, printed or adhered to another material has inevitably been limited.

To improve the adherence of other materials to polypropylene resins, a specific primer coating has been applied to the polypropylene. However, primer coatings are expensive, and not always successful. Accordingly, a plasma surface treatment of the polypropylene using oxidizing gases has recently been suggested, to improve the adherability of the surface. By this method, the adherability of the surface of polypropylene resins has been improved to a practically sufficient level.

Polypropylene resins also have the disadvantage of poor weather resistance. Moldings which are used outdoors, such as automobile bumpers, must have good weatherability, and to do so, various kinds of stabilizers have been used.

Of these stabilizers, compounds containing 2,2,6,6-tetramethyl piperidyl groups in the molecule give the best stabilizing effects, and thus are usually added to moldings which are to be coated so as to prevent such degradation.

However, when a low temperature plasma treatment is applied to the surface of a polypropylene resin molding which contains a 2,2,6,6-tetramethyl piperidyl compound, to improve the adherability, the adherability is often degraded significantly, and after coating, the coating film can be peeled off or swelled out, raising serious problems.

In accordance with the present invention, these problems are overcome by subjecting a surface a polypropylene to the action of activated oxygen gas at a temperature below about 100° C. in the presence of a 2,2,6,6-tetramethyl piperidyl compound for a time sufficient to improve such weather resistance and adherence.

The 2,2,2,6-tetramethyl piperidyl compound contains at least one group having the formula:

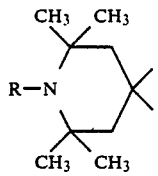

wherein R is selected from the group consisting of alkyl, hydroxyalkyl and alkoxy, having from about one to eighteen carbon atoms, alkylaryl having from seven to about eighteen carbon atoms, and acyl having from one to about eighteen carbon atoms.

The invention accordingly also provides polypropylene resin moldings have excellent weather resistance and adherence to other materials, comprising polypropylene and a compound having an N-alkyl or N-acyl 2,2,2,6-tetramethyl piperidyl group represented by the formula:

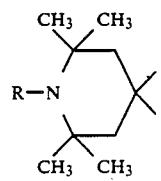

wherein R is selected from the group consisting of alkyl having from one to about eighteen carbon atoms and acyl having from one to about eighteen carbon atoms, after having been subjected to such a low temperature plasma treatment.

The low temperature plasma treatment is effected at a temperature below about 100° C., and preferably at below about 50° C., by causing a low pressure oxidizing gas, oxygen or a mixture of oxygen with ozone, nitrogen, air, argon, carbon dioxide, chlorine, fluorine or bromine, or excite by high frequency electric discharge or microwave discharge, so as to generate an activated gas, and contacting the surface of the polypropylene moldings with the activated gas. Treatment time and gas pressure are not critical. An effective treatment is obtained at a gas pressure within the range from about 0.1 to about 10 torr for from about 5 seconds to about 15 minutes.

In the foregoing Formula (I), the R alkyl includes methyl, ethyl, propyl, isopropyl, butyl, isobutyl, pentyl, hexyl, octyl, 2-ethylhexyl, decyl, dodecyl, tetradecyl and octadecyl; alkylaryl include benzyl, phenylethyl, phenpropyl, phenbutyl, phenhexyl, phenoctyl, phendodecyl, hydroxyalkyl include hydroxyethyl, hydroxypropyl, hydroxybutyl, hydroxyhexyl, hydroxyoctadecyl; and alkoxy including ethoxyethyl and 2,3-epoxypropyl.

Exemplary R acyl include acetyl, propionyl, acryloyl, methacryloyl, butyroyl, octanoyl, decanoyl, dodecanoyl, octadecanoyl, benzoyl, 4-tertbutylbenzoyl, salicyloyl and phthaloyl.

The N-alkyl and N-acyl (or 1-alkyl and 1-acyl) 2,2,6,6-tetramethyl piperidine compounds of this invention are known compounds that as indicated have in the molecule the group:

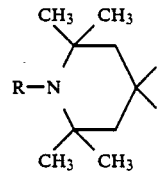

Such 2,2,6,6-tetramethyl piperidine compounds, inter alia, are disclosed in the following illustrative patents:
Japanese patents Nos. 46-31733, 46-31734, 46-31735, 47-1628, 47-7380, 47-8539 and 48-12410; Japan kokai Nos. 46-5082, 47-590, 48-95986, 49-53570, 49-58085, 49-60337, 49-61236, 49-61238, 49-63738, 49-64634, 49-72332, 49-120492, 50-5435, 50-26779, 52-78876, 52-89677, 52-91875, 52-125175, 52-139071, 53-67749, 53-71082, 54-71185, 54-103877, 56-30985, 56-75488, 56-138189, 56-161387, 57-24393, 57-58681, 57-63359, 57-80453, 57-121034, 57-137358, 57-146755, 57-167316, 57-177022, 58-5319, 58-10568, 58-32642, 58-32864, 58-37025, 58-38720, 58-4703058-53931, 58-57444, 58-574445, 58-69879, 58-77862, 58-92660, 58-108238, 58-120646, 58-152053, 58-152881, 58-154739, 58-159460, 58-168634, 58-194862, 58-194931, 58-201777, 58-206594, 58-210094, 58-217554;

U.S. Pat. Nos. 3,542, 792, 3,640,928, 3,684,765, 3,705,126, 3,893,972, 3,925,376, 3,929,804, 3,940,401, 3,992,390, 3,899,464, 3,984,371, 3,971,795, 3,959,291, 3,993,655, 4,007,158, 4,038,280, 4,061,616, 4,086,204, 4,089,841, 4,096,114, 4,101,508, 4,102,858, 4,104,248, 4,104,251, 4,105,625, 4,107,139, 4,108,829, 4,110,334, 4,115,476, 4,116,927, 4,118,369, 4,128,608, 4,136,081, 4,140,673, 4,144,244, 4,148,784, 4,151,356, 4,154,722, 4,161,592, 4,162,246, 4,166,813, 4,173,599, 4,177,186, 4,185,007, 4,197,236, 4,198,334, 4,210,612, 4,219,465, 4,223,147, 4,234,728, 4,237,297, 4,238,388, 4,238,613, 4,276,401, 4,279,804, 4,288,593, 4,289,686, 4,293,466, 4,293,467, 4,293,468, 4,308,362, 4,309,546, 4,311,820, 4,312,804, 4,315,859, 4,316,025, 4,316,837, 4,317,911, 4,321,374, 4,322,531, 4,326,063, 4,331,586, 4,335,242, 4,336,183, 4,340,534, 4,348,524, 4,351,915, 4,356,279, 4,356,287, 4,356,307, 4,369,274, 4,369,321, 4,376,836, 4,378,443, 4,395,508, 4,400,513, 4,404,301, 4,405,735, 4,408,051, 4,412,021, 4,413,075, 4,413,076, 4,413,093 and 4,413,096.

Particularly preferred classes of 2,2,6,6-tetramethyl piperidyl compounds have the formulae II and III:

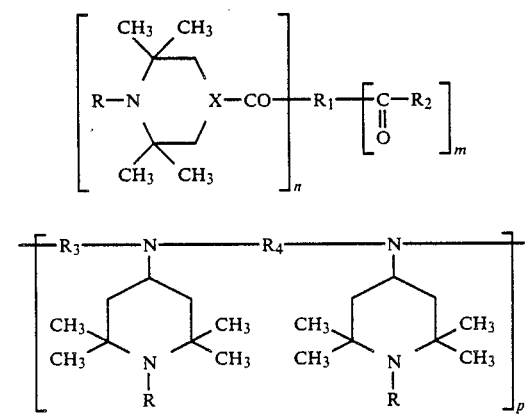

wherein;

R is selected from the group consisting of alkyl having from one to about eighteen carbon atoms; and acyl having from one to about eighteen carbon atoms;

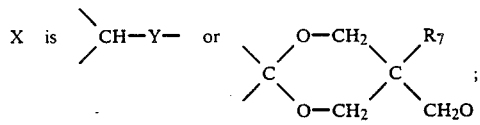

Y is —O— or —N($R_8$)—;

$R_7$ is alkyl having from one to about five carbon atoms;

$R_8$ is hydrogen or alkyl having from one to about eighteen carbon atoms;

$R_1$ is a residue of mono- or poly-carboxylic acid;

n is a number from 1 to about 6;

m is a number from 0 to about 5; and n+m is from 1 to about 6;

$R_2$ is —O—$R_8$ or —N($R_8$)$R_9$;

$R_9$ is alkyl having from one to about eighteen carbon atoms; and $R_8$ and $R_9$ may be taken together to form alkylene or oxadialkylene;

$R_3$ is alkylene or

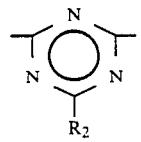

$R_4$ is alkylene; and p is a number from one to about twenty; p represents the number of units in the polymer molecule of III.

Exemplary N-alkyl and N-acyl 2,2,6,6-tetramethyl piperidyl compounds include 1,2,2,6,6-pentamethyl-4-piperidylbenzoate, bis(1,2,2,6,6-pentamethyl-4-piperidyl) sebacate, bis(1-benzyl-2,2,6,6-tetramethyl-4-piperidyl) sebacate, bis(1-acetyl-2,2,6,6-tetramethyl-4-piperidyl) sebacate, tetrakis(1,2,2,6,6-pentamethyl-4-piperidyl) butanetetracarboxylate, tetrakis(1-octyl-2,2,6,6-pentamethyl-4-piperidyl) butanetetracarboxylate, tetrakis(1-acetyl-2,2,6,6-tetramethyl-4-piperidyl) butanetetracarboxylate, bis(1,2,2,6,6-pentamethyl-4-piperidyl-2-butyl-2-(3,5-di-tert-butyl-4-hydroxybenzyl) malonate, bis(1-acryloyl-2,2,6,6-tetramethyl-4-piperidyl)-2-butyl-2-(3,5-di-tert-butyl-4-hydroxybenzyl) malonate, bis(1,2,2,6,6-pentamethyl-4-piperidyl)di-(tridecyl)-butanetetracarboxylate, bis[1-(2,3-epoxypropyl)-2,2,6,6-tetramethyl-4-piperidyl]-di(tridecyl) butanetetracarboxylate, N-1,2,2,6,6-pentamethyl-4-piperidyl) dodecyl succinic acid imide, 3,9-bis[1,1-dimethyl-2-tris (1,2,2,6,6-pentamethyl-4-piperidyloxycarbonyl) butylcarbonyloxyethyl]-2,4,8,10-tetraoxaspiro[5.5]undecane, 1,3,8-triaza-7,7,9,9-tetramethyl-3-dodecyl-8-acetylspiro [4.5]decane-2,4-di-one, bis(3ethyl-8,8,9,10,10-pentamethyl-1,5-dioxaspiro [5.5]-3-undecylmethylether.

Small amounts of these compounds is effective. An amount within the range from about 0.001 to 5 parts by weight, preferably from about 0.01 to about 3 parts by weight, per 100 parts by weight of the resin, is satisfactory.

Any polypropylene resin can be improved by the process of the present invention, including propylene homopolymers and random or block copolymers of propylene and an α-olefin which contain ethylene or other α-olefin in an amount from 1 to 30 wt. %, as well as blends of polypropylene with other olefin polymers and copolymers, such as low and high density polyethylene, ethylene/vinyl acetate copolymer, ethylene/propylene copolymer rubbers and styrene/butadiene block-copolymer rubbers.

In addition, phenolic antioxidants, thioether antioxidants, organic phosphorus-containing compounds such as organic phosphites, and other ultraviolet light absorbers can be added to the polypropylene resin, as needed to improve resistance to oxidation and light.

Phenolic antioxidants which can be employed together with the stabilizer of the invention include 2,6-di-t-butyl-p-cresol, 2,6-di-phenyl-4-octadecyloxyphenol, stearyl(3,5-di-t-butyl-4-hydroxyphenyl)-propionate, distearyl-3,5-di-t-butyl-4-hydroxybenzylphosphonate, thio-diethylenebis(3,5-di-t-butyl-4-hydroxyphenylpropionate, hexamethylene-bis(3,5-di-t-butyl-4-hydroxyphenylpropionate, 4,4'-thiobis(6-t-butyl-m-cresol), 2-octylthio-4,6-bis(3,5-di-t-butyl-4-hydroxyphenoxy)-s- triazine, 2,2'-methylenebis(4-methyl-6-t-butylphenol), 2,2'-methylene-bis(4-ethyl-6-t-butylphenol), bis(3,3-bis(4-hydroxy-3-t-butylphenyl) butylic acid) glycol ester, 4,4'-butylidenebis (6-t-butyl-m-cresol), 2,2'-ethylidenebis(4,6-di-t-butylphenol), 2,2'-ethylidenebis(4-sec-butyl-6-t-butylphenol), 3,6-dioxaoctylenebis(3-methyl-5-t-butyl-4-hydroxyphenylpropionate), 1,1,3-tris(2-methyl-4-hydroxy-5-t-butylphenyl)butane, bis(2-t-butyl-4-methyl-6-(2-hydroxy-3-t-butyl-5-methyl benzyl)phenyl) terephthalate, 1,3,5-tris(2,6-dimethyl-3-hydroxy-4-t-butylbenzyl)isocyanurate, 1,3,5-tris(3,5-di-t-butyl-4-hydroxybenzyl)-2,4,6-trimethylbenzene, 1,3,5-tris((3,5-di-t-butyl-4-hydroxyphenyl)-propionyloxyethyl) isocyanurate, tetrakis(methylene-3-(3,5-di-t-butyl-4-hydroxyphenyl)-propionate) methane.

The amount of phenolic antioxidant to be added is within the range from about 0.001 to about 5 parts by weight, and preferably from about 0.01 to about 3 parts by weight, per 100 parts by weight of the resin.

Thioether antioxidants which can be employed together with the stabilizer of the invention, include dialkylthiodipropionates, such as dilauryl-, dimyristyl- and di-stearylthiodipropionate, and esters of $\beta$-alkylthiopropionic acid with polyhydric alcohols, such as pentaerythritol tetrakis($\beta$-dodecylthiopropionate).

Phosphite antioxidants which can be employed together with the stabilizer of the invention include trioctylphosphite, trilaurylphosphite, tridecylphosphite, octyl diphenylphosphite, tris(2,4-di-t-butylphenyl) phosphite, tris(nonylphenyl) phosphite, hexa(tridecyl 1,1,3-tris(2-methyl-4-hydroxy-5-t-butylphenyl) butane triphosphite, tetra($C_{12-15}$alkyl) 4,4'-isopropylidenediphenol diphosphite, tetra(tridecyl)4,4'-butylidenebis(3-methyl-6-ti-butylphenol) diphosphite, hydrogenated-4,4'-isopropylidenediphenol polyphosphite, distearyl pentaerythritol diphosphite, phenyl 4,4'-isopropylidenediphenol pentaerythritol diphosphite, bis(2,4-di-t-butylphenyl) pentaerythritol diphosphite, bis (2,6-di-t-butyl-4-methylphenyl) pentaerythritol diphosphite, di(nonylphenyl) pentaerythritol diphosphite and 4,4'-isopropylidenebis (2-t-butylphenol) di(nonylphenyl) phosphite.

Ultraviolet light absorbers which can be employed together with the stabilizer of the invention include hydroxybenzophenones such as 2-hydroxy-4-methoxybenzophenone, 2-hydroxy-4-n-octoxybenzophenone, 2,2'-dihydroxy-4-methoxybenzophenone and 2,4-dihydroxybenzophenone; benzotriazoles such as 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-methylphenyl) benzotriazole and 2-(2'-hydroxy-3',5'-di-t-amylphenyl) benzotriazole, benzoates such as phenyl salicylate, p-butylphenyl salicylate, 2,4-di-t-butylphenyl-3,5-di-t-butyl-4-hydroxybenzoate and hexadecyl-3,5-di-t-butyl-4-hydroxybenzoate; Ni compounds such as 2,2'-thiobis(4-t-octylphenol) Ni salt, (2,2'-thiobis(4-t-octylphenolate))-n-butylamine Ni and (3,5-di-t-butyl-4-hydroxybenzyl) phosphonic acid monoethyl ester Ni salt; substituted acrylonitriles such as $\alpha$, cyano-$\beta$-methyl-$\beta$-(p-methoxyphenyl) acrylic acid methyl ester; and oxanilides such as N-2-ethylphenyl-N'-2-ethoxy-5-t-butylphenyloxanilide and N-2-ethylphenyl-N'-2-ethoxyphenyloxanilide.

In addition, inorganic fillers such as talc, calcium carbonate and glass fiber, metal soaps such as calcium stearate and calcium stearoyl-lactate, nucleating agents, etc. may be added to the polypropylene resin of the present invention, as occasion demands.

The invention is applicable to polypropylene resin moldings formed in any desired shape by any melting method conventionally known per se in the art, such as injection molding, extrusion molding, blow molding, etc. The molding method constitutes no part of the present invention.

The following Examples represent preferred embodiments of the process and molded products of the invention.

EXAMPLES 1 TO 9

Molding compositions containing stabilizers of the invention and of the prior art were prepared by blending the following compounds uniformly in a high speed mixer:

| Ingredients | Parts by Weight |
| --- | --- |
| Propylene homopolymer | 100 |
| Calcium stearate | 0.1 |
| Tetrakis[methylene-3-(3,5-di-tert-butyl-4-hydroxyphenyl)propionate]methane | 0.1 |
| 2-(2'-Hydroxy-3'-tert-butyl-5'-methylphenyl)-5-chlorobenzotriazole | 0.2 |
| Stabilizer as shown in Table I | 0.2 |

The mixtures were extruded at 230° C. in a 50∅-uniaxial extruder, thereby preparing pellets. Test pieces of 100×100×3 mm were prepared by injection molding of the pellets.

The test pieces were treated in a microwave plasma treatment apparatus (TMZ-9602Z, product of Toshiba Corporation) at room temperature (25° C.) for 10 seconds at a flow rate of 400 cc/minute and a pressure of 0.5 torr, with activated oxygen gas and a power output of 400 W.

The test pieces after having undergone the plasma treatment were sprayed with twin pack polyurethane coating (R-263, product of Nippon Beechemical Co., Ltd.) to attain a film thickness of about 100 to 120 $\mu$. Thereafter, the coated test pieces were baked at 90° C. for 40 minutes.

Then, a strip of the coating film was cut out at a width of 10 mm, and the belt-shaped coating film strip then was peeled off from one end of the cut and folded in the opposite direction, thereby conducting a 180 degree peeling test at a pulling rate of 20 mm/minute. Further, after immersing a coated test piece in hot water of 40° C. for 10 days, it was observed whether or not the coating film was swelled.

Further, using a test piece uncoated and untreated and a test piece uncoated but treated, light stability was measured in a sunshine Weatherometer at 83° C. The results are shown in Table I:

TABLE I

| Example No. | Stabilizer | Hours to Failure Uncoated/ Untreated | Hours to Failure Uncoated/ Treated | Peel strength (g/cm) | Swelling |
| --- | --- | --- | --- | --- | --- |
| Control 1 | None | 400 | 300 | 760 | none |
| Control 2 | Bis(2,2,6,6-tetramethyl-4-piperidyl)sebacate | 2300 | 1500 | 370 | severe |

TABLE I-continued

| Example No. | Stabilizer | Hours to Failure Uncoated/ Untreated | Hours to Failure Uncoated/ Treated | Peel strength (g/cm) | Swelling |
| --- | --- | --- | --- | --- | --- |
| Control 3 | Tetrakis(2,2,6,6-tetramethyl-4-piperidyl)butanetetracarboxylate | 2500 | 1800 | 480 | slight |
| Example 1 | Bis(1,2,2,6,6-pentamethyl-4-piperidyl)sebacate | 2300 | 2000 | 640 | none |
| Example 2 | Bis(1-acetyl-2,2,6,6-tetramethyl-4-piperidyl)sebacate | 2200 | 2000 | 690 | none |
| Example 3 | Tetrakis(1,2,2,6,6-pentamethyl-4-piperidyl)butanetetracarboxylate | 2600 | 2300 | 730 | none |
| Example 4 | Bis(1,2,2,6,6-pentamethyl-4-piperidyl)-di(tridecyl)butanetetracarboxylate | 2500 | 2300 | 720 | none |
| Example 5 | 1,3,8-Triaza-7,7,9,9-tetramethyl-8-acetylspiro[4.5]decane-2,4-dione | 2200 | 1900 | 680 | none |
| Example 6 | 3,9-Bis(1,1-dimethyl-2-(tris-(1,2,2,6,6-pentamethyl-4-piperidyloxycarbonyl)butylcarbonyloxy)ethyl)-2,4,8,10-tetraoxaspiro-[5.5]undecane | 2500 | 2300 | 700 | none |
| Example 7 | Bis(1,2,2,6,6-pentamethyl-4-piperidyl)-2-butyl-2-(3,5-di-t-butyl-4-hydroxybenzyl)malonate | 2200 | 2000 | 620 | none |
| Example 8 | Bis(3-ethyl-8,8,9,10,10-pentamethyl-1,5-dixoaspiro[5.5]-3-undecylmethyl) ether | 2400 | 2100 | 690 | none |
| Example 9 | N-(1,2,2,6,6-Pentamethyl-4-piperidyl)dodecylsuccinimide | 2300 | 1900 | 700 | none |

From the results shown in Table I for Examples 1 to 9, it is apparent that the polypropylene resin moldings which contain a compound having an N-alkyl or N-acyl 2,2,6,6-tetramethyl piperidyl group are superior in light stability after plasma treatment, and also their adherence to coating film is not reduced, as compared with polypropylene resin moldings which contain a compound having the corresponding N-unsubstituted-2,2,6,6-tetramethyl piperidyl group.

EXAMPLES 10 TO 13

Molding compositions containing stabilizers of the invention and of the prior art were prepared by blending the following components uniformly in a high speed mixer:

| Ingredients | Parts by Weight |
| --- | --- |
| Ethylene/propylene random copolymer (ethylene content: 12 wt. %) | 100 |
| Calcium stearate | 0.05 |
| Tetrakis[methylene-3-(3,5-d-di-tertbutyl-4-hydroxyphenyl)propionate]methane | 0.05 |
| 2,6-di-tert-butyl-p-cresol | 0.05 |
| Tris(2,4-di-tert-butylphenyl)phosphite | 0.1 |
| 2-(2'-Hydroxy-3'-tert-butyl-5'-methylphenyl)-5-chlorobenzotriazole | 0.2 |
| Stabilizer shown in Table II | 0.2 |

The mixtures were extruded at 230° C. in a 50∅-uniaxial extruder, thereby preparing pellets. Test pieces of 100×100×3 mm were prepared by injection molding of the pellets.

The test pieces were treated in a microwave plasma treatment apparatus (TMZ-9602Z, product of Toshiba Corporation) at room temperature (25° C.) for 10 seconds at a flow rate of 400 cc/minute and a pressure of 0.5 torr, with activated oxygen gas and a power output of 400 W.

The test pieces after having undergone the plasma treatment were sprayed with twin pack polyurethane coating (R-263, product of Nippon Beechemical Co., Ltd.) to attain a film thickness of about 100 to 120 μ. Thereafter, the coated test pieces were baked at 90° C. for 40 minutes.

Then, a strip of the coating film was cut out at a width of 10 mm, and the belt-shaped coating film strip then was peeled off from one end of the cut and folded in the opposite direction, thereby conducting a 180 degree peeling test at a pulling rate of 20 mm/minute. Further, after immersing a coated test piece in hot water of 40° C. for 10 days, it was observed whether or not the coating film was swelled.

Further, using a test piece uncoated and untreated and a test piece uncoated but treated, light stability was measured in a sunshine Weatherometer at 83° C. The results are shown in Table II:

TABLE II

| Example No. | Stabilizer | Hours to Failure Uncoated/ Untreated | Hours to Failure Uncoated/ Treated | Peel strength (g/cm) | Swelling |
| --- | --- | --- | --- | --- | --- |
| Control 1 | None | 400 | 300 | 620 | none |
| Control 2 | Bis(2,2,6,6-tetramethyl-4-piperidyl)sebacate | 2500 | 1800 | 340 | severe |
| Control 3 | Tetrakis(2,2,6,6-tetramethyl-4-piperidyl)butanetetracarboxylate | 2700 | 2000 | 410 | slight |
| Example 10 | Bis(1,2,2,6,6-pentamethyl-4-piperidyl)sebacate | 2500 | 2200 | 510 | none |
| Example 11 | 1,3,8-Triaza-7,7,9,9-tetramethyl-8-acetylspiro[4.5]decane-2,4-dione | 2300 | 2000 | 540 | none |
| Example 12 | Tetrakis(1,2,2,6,6-pentamethyl-4- | 2800 | 2500 | 570 | none |

TABLE II-continued

| Example No. | Stabilizer | Hours to Failure Uncoated/ Untreated | Hours to Failure Uncoated/ Treated | Peel strength (g/cm) | Swelling |
|---|---|---|---|---|---|
| Example 13 | piperidyl)butanetetracarboxylate Bis(1,2,2,6,6-pentamethyl-4-piperidyl)-di(tridecyl)butane-tetracarboxylate | 2700 | 2300 | 560 | none |

The results for Examples 10 to 13 demonstrate that the polypropylene resin moldings which contain a compound having an N-alkyl or acyl 2,2,6,6-tetramethyl piperidyl group are superior in light stability after plasma treatment and also their adherence to coating film is not reduced, as compared with polypropylene resin moldings which contain a compound having the corresponding N-unsubstituted-2,2,6,6-tetramethyl piperidyl group.

EXAMPLES 14 TO 17

Molding compositions containing stabilizers of the invention and of the prior art were prepared by blending the following components uniformly in a high speed mixer:

| Ingredients | Parts by Weight |
|---|---|
| Propylene homopolymer | 90 |
| Ethylene-propylene rubber (EP02P, product of Japanese EP Rubber Co.) | 10 |
| Calcium stearate | 0.05 |
| Tetrakis(methylene-3-(3,5-3-di-tert-butyl-4-hydroxyphenyl)propionate)methane | 0.2 |
| 2-(2'-Hydroxy-3'-tert-butyl-5'-methylphenyl)-5-chloribenzotriazole | 0.2 |
| Stabilizer shown in Table III | 0.2 |

The mixtures were extruded at 230° C. in a 50Φ-uniaxial extruder, thereby preparing pellets. Test pieces of 100×100×3 mm were prepared by injection molding of the pellets.

The test pieces were treated in a microwave plasma treatment apparatus (TMZ-9602Z, product of Toshiba Corporation) at room temperature (25° C.) for 10 seconds at a flow rate of 400 cc/minute and a pressure of 0.5 torr, with activated oxygen gas and a power output of 400 W.

The test pieces after having undergone the plasma treatment were sprayed with twin pack polyurethane coating (R-263, product of Nippon Beechemical Co., Ltd.) to attain a film thickness of about 100 to 120 μ. Thereafter, the coated test pieces were baked at 90° C. for 40 minutes.

Then, a strip of the coating film was cut out at a width of 10 mm, and the belt-shaped coating film strip then was peeled off from one end of the cut and folded in the opposite direction, thereby conducting a 180 degree peeling test a pulling rate of 20 mm/minute. Further, after immersing a coated test piece in hot water of 40° C. for 10 days, it was observed whether or not the coating film was swelled.

Further, using a test piece uncoated and untreated and a test piece uncoated but treated, light stability was measured in a sunshine Weatherometer at 83° C. The results are shown in Table III:

TABLE III

| Example No. | Stabilizer | Hours to Failure Uncoated/ Untreated | Hours to Failure Uncoated/ Treated | Peel strength (g/cm) | Swelling |
|---|---|---|---|---|---|
| Control 1 | None | 400 | 300 | 630 | none |
| Control 2 | Tetrakis(2,2,6,6-tetramethyl-4-piperidyl)butanetetracarboxylate | 2300 | 1600 | 430 | slight |
| Example 14 | Bis(1,2,2,6,6-pentamethyl-4-piperidyl)sebacate | 2100 | 1700 | 520 | none |
| Example 15 | Tetrakis(1,2,2,6,6-pentamethyl-4-piperidyl)butanetetracarboxylate | 2400 | 2200 | 580 | none |
| Example 16 | Bis(1,2,2,6,6-pentamethyl-4-piperidyl)-di(tridecyl)butane-tetracarboxylate | 2300 | 2100 | 560 | none |
| Example 17 | 3,9-Bis(1,1-dimethyl-2-(tris-(1,2,2,6,6-pentamethyl-4-piperidyloxycarbonyl)butylcarbonyloxy)ethyl)-2,4,8,10-tetraoxaspiro-[5.5]undecane | 2300 | 2000 | 580 | none |

The results shown in Table III for Examples 14 to 17 demonstrate that the polypropylene resin moldings which contain a compound having an N-alkyl or acyl 2,2,6,6-tetramethyl piperidyl group are superior in light stability after plasma treatment and also do not have their adherence to coating film reduced, as compared with polypropylene resin moldings which contain a compound having the corresponding N-unsubstituted-2,2,6,6-tetramethyl piperidyl group.

Having regard to the foregoing disclosure the following is claimed as the inventive and patentable embodiments thereof:

1. Polypropylene resin moldings having excellent weather resistance and adherence to other materials, comprising polypropylene, a compound having an N-alkyl or N-acyl 2,2,6,6-tetramethyl piperidyl group represented by the formula:

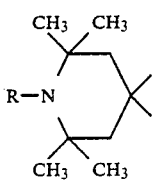

where R is selected from the group consisting of alkyl having from one to about eighteen carbon atoms and acyl having from one to about eighteen carbon atoms, and a phenolic antioxidant, after having been subjected to a plasma treatment comprising subjecting a surface of the polypropylene to the action of activated oxygen gas at a temperature below about 100° C. in the presence of the N-alkyl or N-acyl 2,2,6,6-tetramethyl piperidyl compound and phenolic antioxidant for a time sufficient to improve such weather resistance and adherence.

2. Polypropylene resin moldings according to claim 1 in which the gas is a mixture of activated oxygen and a gas selected from the group consisting of air, argon, nitrogen, carbon dioxide, chlorine, fluorine and bromine.

3. Polypropylene resin moldings according to claim 1 in which the temperature is from 25° to about 50° C.

4. Polypropylene resin moldings according to claim 1 in which the time is from five seconds to about 15 seconds.

5. Polypropylene resin moldings according to claim 1 in which the polypropylene is polypropylene homopolymer.

6. Polypropylene resin moldings according to claim 1 in which the polypropylene is a copolymer of propylene and another α-olefin.

7. Polypropylene resin moldings according to claim 1 in which the N-alkyl or N-acyl 2,2,6,6-tetramethyl piperidyl compound has an N-acyl or N-alkyl 2,2,6,6-tetramethyl piperidyl group that has the formula:

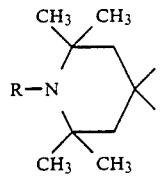

wherein R is selected from the group consisting of alkyl having from one to about eighteen carbon atoms and acyl having from one to about eighteen carbon atoms.

8. Polypropylene resin moldings according to claim 7 in which R is alkyl.

9. Polypropylene resin moldings according to claim 7 in which R is acyl.

10. Polypropylene resin moldings according to claim 7 in which the 2,2,6,6-tetramethyl piperidyl compound is bis(1,2,2,6,6-pentamethyl-4-piperidyl) sebacate.

11. Polypropylene resin moldings according to claim 7 in which the 2,2,6,6-tetramethyl piperidyl compound is tetrakis(1,2,2,6,6-pentamethyl-4-piperidyl) butanetetracarboxylate.

12. Polypropylene resin moldings according to claim 7 in which the 2,2,6,6-tetramethyl piperidyl compound is bis(1,2,2,6,6-pentamethyl-4-piperidyl)-di(tridecyl) butanetetracarboxylate.

13. Polypropylene resin moldings according to claim 7 in which the 2,2,6,6-tetramethyl piperidyl compound is 3,9-bis(1,1-dimethyl-2-(tris(1,2,2,6,6-pentamethyl-4-piperidyloxycarbonyl) butylcarbonyloxy)ethyl-2,4,8,10-tetraoxaspiro-[5.5]undecene.

* * * * *